3,532,763
METHOD FOR REMOVING MONO-OLEFINS FROM A PROPADIENE-MONO-OLEFIN GASEOUS HYDROCARBON MIXTURE
Russell L. Stewart, Midland, and Chester E. Pawloski, Bay City, Mich., assignors to The Dow Chemical Company, Midland, Mich., a corporation of Delaware
No Drawing. Filed Dec. 10, 1968, Ser. No. 782,765
Int. Cl. C07c 7/00, 11/22
U.S. Cl. 260—681.5                                    8 Claims

ABSTRACT OF THE DISCLOSURE

Mono-olefins are substantially removed from a propadiene-mono-olefin gaseous hydrocarbon mixture by chlorinating said mixture in the presence of an inert solvent, e.g. the liquid chlorination products of the mixture, generally at a temperature below about 60° C.

BACKGROUND OF THE INVENTION

This invention relates to methods for purifying propadiene. Propadiene often exists in mixtures with mono-olefins, e.g. ethylene and propylene. These mixtures are very difficult and expensive to separate.

A substantially pure propadiene is often needed for industrial use. For example, if impure propadiene were used in making bornylene derivatives the side product formation would be considerable. Similarly, while the excellent nematocide 2,3-dichloropropene can be made by chlorinating pure propadiene, if propylene is present the not as effective 1,2-dichloropropane is also produced.

SUMMARY OF THE INVENTION

It has now been found that mono-olefins are substantially removed from a propadiene-mono-olefin-containing gaseous hydrocarbon mixture by a process comprising chlorinating said mixture in the presence of an inert liquid solvent.

This result is quite surprising since the gaseous hydrocarbon mixture contains both the very reactive cumulated double bond of propadiene and the generally less reactive isolated double bond of the mono-olefin. Even so, under the conditions of this process, substantially all of the mono-olefins are reacted to the substantial exclusion of propadiene. For example, when this process is applied to the preferred propadiene-propylene-containing gaseous hydrocarbon mixture, substantially all of the propylene is reacted to form mostly 1,2-dichloropropane while a surprisingly low portion of the propadiene is consumed.

In order to practice the invention, the gaseous hydrocarbon mixture is contacted with chlorine, in any convenient manner, while in the presence of an inert liquid solvent. For example, the gaseous hydrocarbon mixture and chlorine can simply be bubbled through the liquid solvent in such a manner as to provide their contact. After the reaction, the gaseous product from which the mono-olefins have been substantially removed is collected as an off-gas product while the liquid chlorination products of the reaction remain behind with the solvent.

The gaseous mixture to be processed consists of propadiene and at least one mono-olefinic compound. Typical mono-olefins that can be in mixture with propadiene include ethylene, propylene, n-butene, cyclobutene, isobutene, and other olefins, e.g. those having up to about eight carbon atoms.

In addition to containing mono-olefins and propadiene, the hydrocarbon mixture to be processed can contain acetylenics, e.g. acetylene, methylacetylene, and other acetylenics, e.g. those having up to about five carbon atoms. Similarly, the alkanes can be present, e.g. methane, ethane, propane, isobutane, n-butane, cyclohexane, and other alkanes, e.g. alkanes having up to about eight carbon atoms. In a preferred mixture consisting essentially of methylacetylene, propadiene, propylene and propane, use of the process herein described removes the propylene to the substantial exclusion of the propane, propadiene and methylacetylene. The resulting propylene-free mixture is an excellent cutting and welding fuel.

The ratio of chlorine to mono-olefin can vary depending upon the amount of mono-olefin removal desired. Generally, it is preferred to use a molar ratio of chlorine to mono-olefin present within the hydrocarbon mixture of at least 0.5 to 1.0. This ratio will typically remove all mono-olefins present in the mixture with the exception of propylene. A molar ratio of chlorine to mono-olefin of at least 1.5 to 1.0 will insure that substantially all mono-olefins, including propylene, are moved from the hydrocarbon mixture.

The temperature used in this process is not critical, and generally any temperature below about 60° C. can be employed. Typically, temperatures between about −10 and 30° C. are used with good effectiveness. Preferably, the reaction temperature is between about 8 and 15° C. Similarly, pressure is not critical. It is preferred to use pressures of around one atmosphere or slightly greater or less, e.g. between 0.5–1.5 atmospheres.

Any solvent can be used in conjunction with this process so long as it is inert and liquid under the reaction conditions. A preferred solvent is any one or more of the liquid products of the reaction. Typical other solvents that are useful are toluene, tetrachloroethane and benzene. These solvents can be used independently or in mixture themselves or any or more of the liquid chlorination products of the reaction.

Although not critical to the invention, it has been found that a catalytic amount of hydrogen chloride in the reaction mixture will facilitate removal of the mono-olefins. Typically, hydrogen chloride can be bubbled through the liquid reaction mixture to assist in mono-olefin removal. When hydrogen chloride is used, the molor ratio of chlorine to mono-olefin necessary to achieve the same degree of mono-olefin removal achieved without hydrogen chloride is typically less.

DESCRIPTION OF SPECIFIC EMBODIMENTS

A series of mono-olefin removal runs was conducted as follows:

Into a one liter glass pot reactor equipped with a cooling jacket, condenser, chlorine feed port, gaseous hydrocarbon mixture feed port, off-gas Dry Ice-acetone trap and thermometer was placed 500 ml. of 1,2-dichloropropane. After cooling the 1,2-dichloropropane to reaction temperature, i.e. 9–12° C., the gaseous hydrocarbon mixture and the chlorine were independently fed into the reactor so that they bubbled through the 1,2-dichloropropane and came into contact with one another. The off-gas was collected and analyzed by vapor phase chromatography.

The entering hydrocarbon stream, molar ratio of chlorine to propylene and composition of off-gas product for a series of runs is reported in the table below. Substantially all of the alkanes, and most of the propadiene and acetylenics passed through the reactor unchanged.

TABLE

| Component | Entering gaseous hydrocarbon stream for Runs 1-5, mole percent | Off-gas product, mole percent | | | | |
|---|---|---|---|---|---|---|
| | | Run Number | | | | |
| | | 1 | 2 | 3[1] | 4 | 5 |
| Propadiene | 29.4 | 29.9 | 30.0 | 30.0 | 29.5 | 29.7 |
| Propylene | 8.8 | 7.8 | 8.2 | 5.5 | 6.2 | 0 |
| Misc. olefins | 0.5 | 0 | 0 | 0 | 0 | 0 |
| Propane | 24.5 | 25.8 | 27.2 | 27.6 | 28.4 | 31.0 |
| n-Butane | 3.5 | 3.4 | 3.2 | 3.4 | 3.4 | 3.6 |
| Misc. alkanes | 0.4 | 0.6 | 0.7 | 0.7 | 0.6 | 0.7 |
| Methylacetylene | 32.9 | 32.5 | 30.7 | 32.8 | 31.9 | 35.0 |
| Molar ratio, Cl$_2$/propylene | | 0.82 | 1.15 | 1.15 | 1.25 | 1.50 |

[1] Hydrogen chloride present in liquid in catalytic amount.

We claim:

1. A method for removing mono-olefins from a propadiene-mono-olefin-containing gaseous hydrocarbon mixture comprising chlorinating said mixture in the presence of an inert liquid solvent.

2. A method as defined in claim 1 wherein the temperature is below about 60° C.

3. A method as defined in claim 2 wherein the molar ratio of chlorine to mono-olefin present in the hydrocarbon mixture is at least 0.5 to 1.0.

4. A method as defined in claim 3 wherein the hydrocarbon mixture is essentially methylacetylene, propadiene, propylene and propane.

5. A method as defined in claim 4 wherein the molar ratio of chlorine to mono-olefin is at least 1.5 to 1.0.

6. A method as defined in claim 1 wherein a catalytic amount of hydrogen chloride is present in the liquid solvent.

7. A method as defined in claim 1 wherein the temperature is between —10 and 30° C.

8. A method as defined in claim 1 wherein the solvent is the liquid chlorination products of the gaseous hydrocarbon mixture.

References Cited

UNITED STATES PATENTS 2,520,712    8/1950    Cheney _____ 260—677

DEBERT E. GANTZ, Primary Examiner

G. E. SCHMITKONS, Assistant Examiner

U.S. Cl. X.R.

260—660, 679